(12) United States Patent
Kobeda et al.

(10) Patent No.: US 8,854,849 B2
(45) Date of Patent: Oct. 7, 2014

(54) POWER-SAVING VOLTAGE CONVERTER SYSTEM

(75) Inventors: Edward Kobeda, Raleigh, NC (US); Randhir S Malik, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 146 days.

(21) Appl. No.: 13/348,987

(22) Filed: Jan. 12, 2012

(65) Prior Publication Data

US 2013/0182472 A1    Jul. 18, 2013

(51) Int. Cl.
*H02M 7/5383*    (2007.01)

(52) U.S. Cl.
USPC ............................................... 363/74

(58) Field of Classification Search
USPC .............. 363/74, 76, 78, 79, 84, 86; 323/318; 320/111, 114, 115
See application file for complete search history.

(56) References Cited

U.S. PATENT DOCUMENTS

| | | | |
|---|---|---|---|
| 5,721,481 | A | 2/1998 | Narita et al. |
| 6,754,092 | B2 | 6/2004 | McDowell et al. |
| 7,698,585 | B2 * | 4/2010 | Malik et al. ............ 713/320 |
| 7,999,516 | B2 | 8/2011 | Hartular et al. |
| 8,164,932 | B2 * | 4/2012 | Sims et al. ............ 363/69 |
| 2008/0007124 | A1 | 1/2008 | Lee |
| 2009/0108680 | A1 | 4/2009 | Minemura |
| 2009/0121686 | A1 | 5/2009 | Lo |
| 2010/0033139 | A1 | 2/2010 | An |
| 2010/0141049 | A1 | 6/2010 | Shiu |
| 2010/0284206 | A1 | 11/2010 | Tai et al. |
| 2011/0050001 | A1 | 3/2011 | Dake |
| 2011/0187315 | A1 | 8/2011 | McGinley et al. |
| 2012/0256568 | A1 | 10/2012 | Lee |
| 2013/0077349 | A1 | 3/2013 | Jin et al. |
| 2013/0141041 | A1 | 6/2013 | Hein et al. |

FOREIGN PATENT DOCUMENTS

| | | |
|---|---|---|
| CN | 101459347 | 6/2009 |
| JP | 2000004547 | 1/2000 |
| JP | 2000102184 | 4/2000 |
| JP | 2007124078 | 5/2007 |

OTHER PUBLICATIONS

IBM Technical Disclosure Bulletin, H. Horikoshi, Low Power Alternate Current/Direct Current Adapter, Sep. 1, 1997, 3 pages.
IBM Technical Disclosure Bulletin, H. Horikoshi and K. Suzuki, Dynamic Control Method for AC Adapter Power Saving, Mar. 1, 1998, 4 pages.
IBM, Green Standby Power, Nov. 11, 2009, 4 pages.
Office Action for U.S. Appl. No. 13/754,798, U.S. Patent and Trademark Office, mailed Oct. 25, 2013, 13 pages.
Office Action for U.S. Appl. No. 13/754,798, U.S. Patent and Trademark Office, mailed Jun. 20, 2014, 10 pages.

\* cited by examiner

*Primary Examiner* — Adolf Berhane
*Assistant Examiner* — Afework Demisse
(74) *Attorney, Agent, or Firm* — VanLeeuwen & VanLeeuwen; Steven L. Bennett

(57) ABSTRACT

A voltage converter system having a converter and a connector system may include a control circuit that enables or disables the converter in response to the connection status of the connector system.

17 Claims, 4 Drawing Sheets

POWER-SAVING VOLTAGE CONVERTER SYSTEM

BACKGROUND

The present invention relates to the field of power supplies, and more specifically, to reducing power consumption in power supplies for electronic devices requiring a non-commercial voltage supply, as is typical of mobile electronic products.

Individuals and corporations are becoming increasingly aware of their energy consumption and are actively seeking to reduce it. Whether the primary motivation is to reduce the size of a carbon footprint or save on energy costs, consumers are demanding more energy efficient and eco-friendly products from manufacturers. In our age of ubiquitous electronic devices, consumers and regulators are becoming increasingly aware of the energy costs of electronics. A common culprit of energy inefficiency is the so-called energy vampire. Common electrical devices, such as computers, televisions, and appliances require standby power and consume electricity even when the device is off. Standby power accounts for the power necessary to allow the device to maintain information even when it is off, respond to remote controls, or provide other functions. It also accounts for parasitic losses in the device. The power consumed in standby mode is comparable to the power consumed in active mode for many devices.

Many devices, such as laptop computers, cell phones, e-readers, and so-called tablets or slates, plug into an AC adapter that acts as a power supply and/or battery charger that converts the voltage of the commercially available power to one the electronic device uses. Many consumers leave such chargers plugged in after the device's battery has been charged, and even after the device is disconnected altogether. These idle chargers continue to consume energy even when they are no longer providing any valuable function. Arguably, the power consumed by adapters is entirely wasted since it provides no functional value to the owner other than the convenience of leaving the adapter plugged in. The EPA estimates that the power consumed by devices that are off or by chargers left plugged in amounts to approximately 45 billion kilowatt-hours of electricity per year and costs upwards of 3.5 billion dollars annually. Given these significant costs, the industry is focusing on ways to reduce the power consumed by the electronic devices they manufacture.

BRIEF SUMMARY

According to one embodiment of the present invention, a converter system may include a converter configured to convert electrical energy having an input voltage received from an external electrical energy source into electrical energy having an output voltage different than the input voltage. The converter may include a control assembly responsive to a first control signal and operable in a first mode in response to a first state of the first control signal. The first mode of operation of the control assembly may enable operation of the converter. The control assembly may also be operable in a second mode in response to a second state of the first control signal, the control assembly disabling operation of the converter when operated in the second mode. A first electrical connector component may be configured to connect with a second electrical connector component to conduct energy from the converter to an associated external electrical device at the output voltage when the first electrical connector component is connected to the second electrical connector component but not to conduct energy from the converter to the associated external electrical device when the first electrical connector component is not connected to the second electrical connector component. A control circuit may be operatively coupled to the first electrical connector component and the converter, the control circuit being configured to provide the first control signal in the first state when the first electrical connector component is connected to the second electrical connector component, and to provide the first control signal in the second state when the first electrical connector component is not connected to the second electrical connector component.

According to another embodiment of the present invention, a converter may be configured to convert electrical energy having an alternating current voltage into electrical energy having a direct current voltage. The converter may include a control assembly responsive to a first control signal and operable in a first mode in response to a first state of the first control signal for enabling operation of the converter, and operable in a second mode in response to a second state of the first control signal for disabling operation of the converter. A first electrical connector component may be configured to connect with a second electrical connector component associated with an external electrical device. The first electrical connector component may provide a second control signal having a connected state when the first electrical connector component is connected to the second electrical connector component, and a disconnected state different from the connected state when the first electrical connector component is not connected to the second electrical connector component. A control circuit may be responsive to the second control signal. The control circuit may be configured to provide the first control signal in the first state when the second control signal is in the connected state and to provide the first control signal in the second state when the second control signal is in the disconnected state.

According to yet another embodiment of the present invention, a first electrical circuit may be configured to convert alternating current into substantially direct current. The first electrical circuit may include a flyback converter having a pulse width modulator (PWM) configured to receive a control signal. A control circuit may be configured to receive a connection status signal and to provide the control signal to the PWM in response to the connection status signal. An electrical connector component may be configured to electrically connect to an external device and to provide the connection status signal to the control circuit based on whether or not the electrical connector component is electrically connected to the external device. In response to a first state of the control signal the PWM may enable the flyback converter, and in response to a second state of the control signal the PWM may disable the flyback converter.

BRIEF DESCRIPTION OF THE SEVERAL VIEWS OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
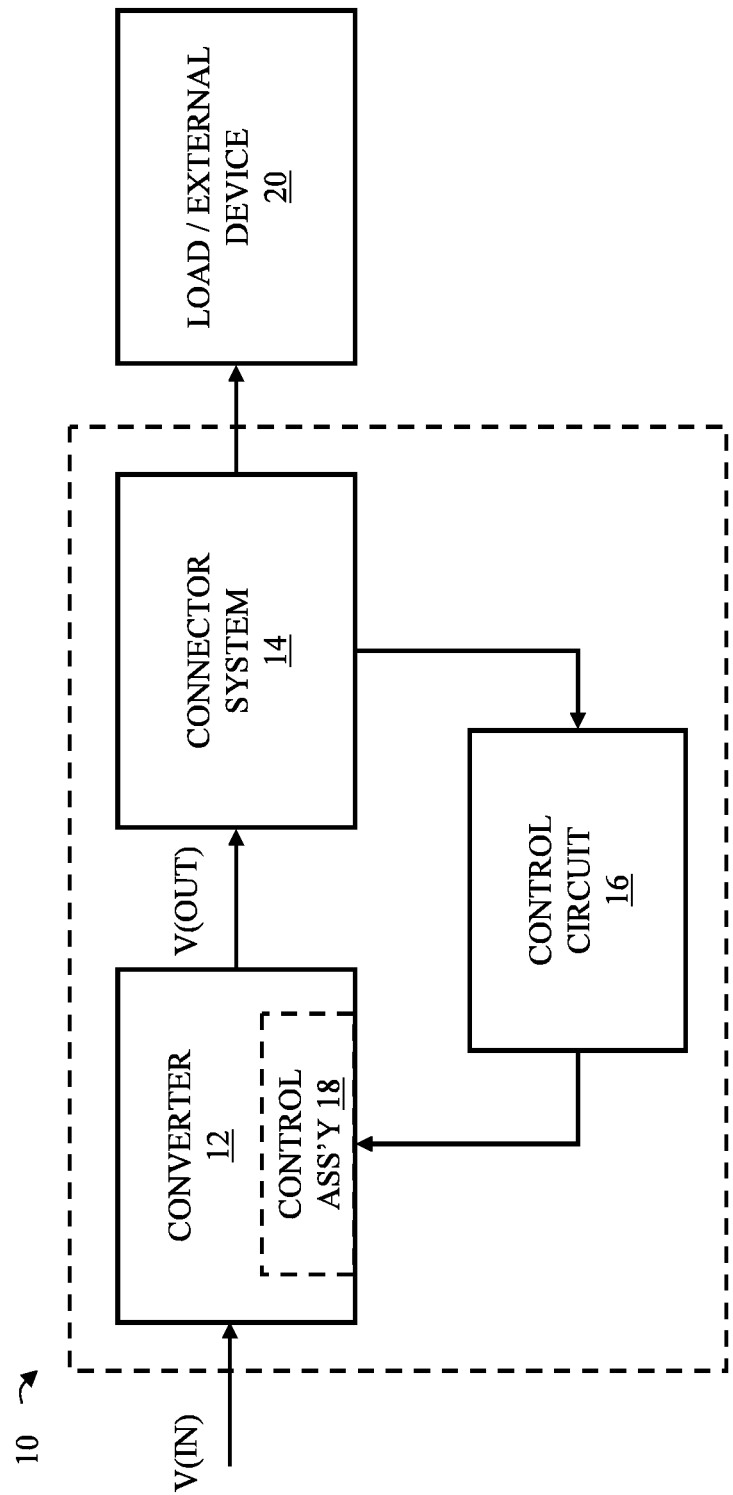
FIG. 1 is a block diagram showing the general operation of an illustrative converter system.

Referring now to FIG. 1, a converter system is generally shown at 10. Converter system 10 may include a converter 12, a connector assembly or system 14, and/or a control circuit 16. Converter 12 may be any suitable circuit configured to convert from an input voltage V(IN), provided by an external electrical energy source, to an output voltage V(OUT), and may include a control assembly 18. For example, converter 12 may be configured to convert from an alternating current (AC) input to a direct current (DC) output voltage, from an AC input of one voltage to an AC output of a different voltage, from a DC input of one voltage to a DC output of a different voltage, or from a DC input to an AC output. Control assembly 18 may include one or more electrical elements configured to operate in a first mode enabling converter 12 to operate, or in a second mode disabling converter 12 from operating, in response to a control signal. Control assembly 18 may enable and disable all or partial operation of converter 12. For example, control assembly 18 may include an in-line switch or other device that is operable to effectively allow or impede current flow in an associated conductor.

Connector system 14 may be any suitable system for connecting converter 12 to an external load or device 20, such as a mobile electronic device having a rechargeable battery, or any electronic device requiring an input voltage that is different than an available source voltage.

Control circuit 16 may be any suitable electrical and/or electronic circuit operationally coupled to connector system 14 and configured to control the operation of control assembly 18 based on a state of the connector system by providing the control signal to the control assembly. The control signal, in turn, may have two states. In response to a first state of the control signal, control assembly 18 may enable operation of converter 12, and in response to a second state of the control signal, control assembly 18 may disable operation of converter 12.

Figure 2:
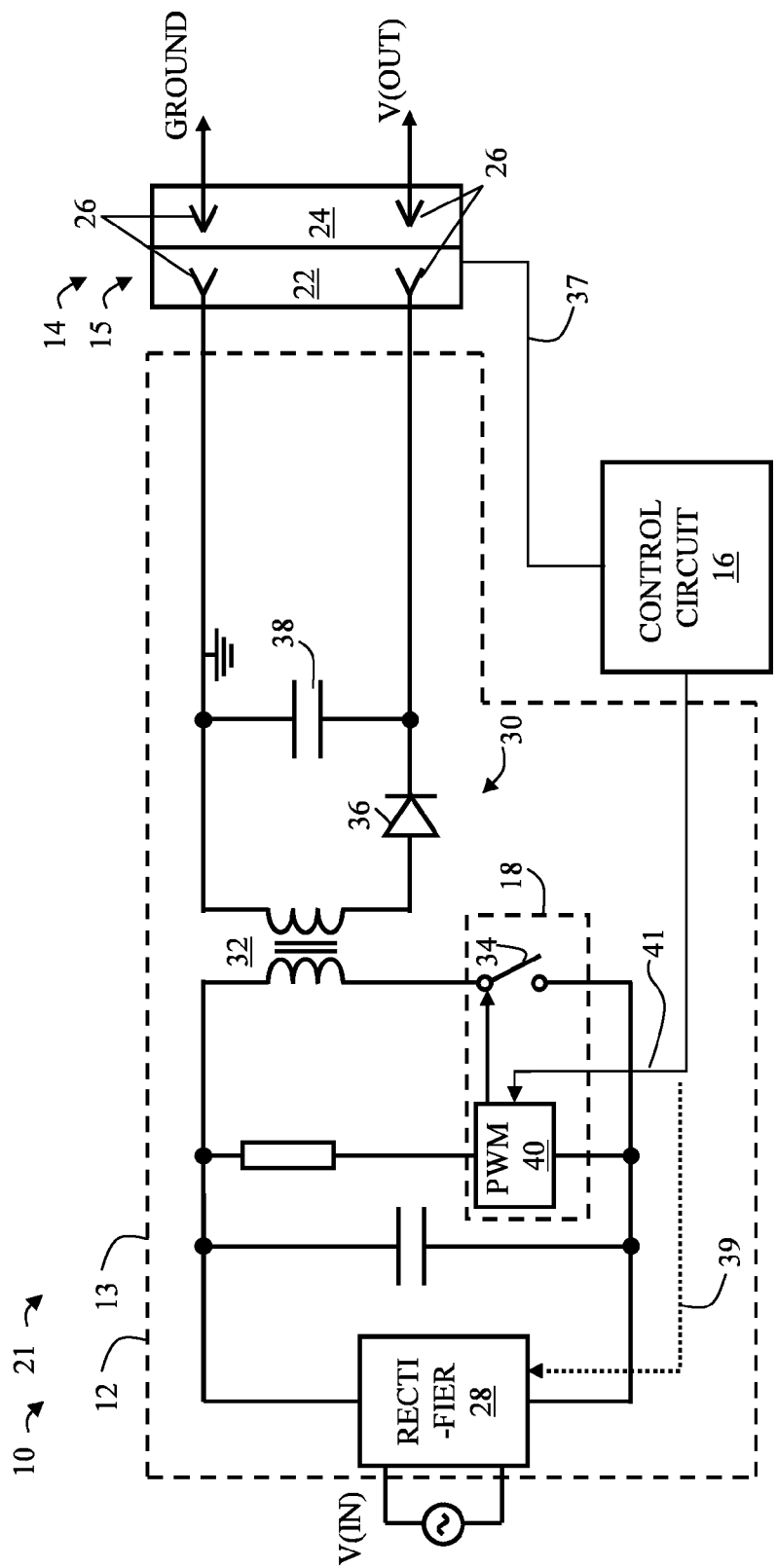
FIG. 2 is a generalized schematic diagram showing an illustrative adapter system.

Referring now to FIG. 2, an example of converter system 10 is shown as an AC-to-DC adapter system 21 configured to convert an AC V(IN) to a DC V(OUT). In this example, adapter system 21 may include a converter 13, as an example of converter 12, a connector system 15 as an example of connector system 14, and a control circuit 16. Connector system 15 provides a physical interface for electrically connecting external device 20 (shown in FIG. 1) to converter 13. This physical interface may include a first connector component 22 electrically connected to converter 13 and configured to couple electrically and selectively with a second connector component 24, which may be electrically connected to external device 20. First connector component 22 may be manually or mechanically positioned in connection with second connector component, such as by inserting a plug into a receptacle. First connector component 22 may be configured to achieve the functions described below and to present a standard or preexisting interface for a conventional second connector component 24 of external device 20. The combination of connector components 22 and 24 may also be configured to provide the connections described below. Connector components 22 and 24, individually or in combination, may also include electromechanical parts that may be actuated by connection of connector components 22 and 24 together. Many variations of the connector system are possible. A suitable design may be selected based on a particular application. Accordingly, it will be seen that connector system 15 may be considered to include connector components 22 and 24, whether or not the components are coupled.

First connector component 22 and second connector component 24 may take the form of complementary or mating electrical connectors having multiple connector elements 26 attached to corresponding conductors. Connector elements 26 may be any suitable male or female members or elements configured to couple together to provide a secure electrical connection. For example, connector elements 26 may include blades, pins, sheaths, conductors, contacts, or any other connector element well known in the art. Connector components 22 and 24 may be configured as a plug and socket connector system. Connector components 22 and 24 may be keyed, shielded, and/or coaxial. In some examples, connector system 14 may include a four-pin or other plug and socket connection, coaxial power connectors, barrel connectors, concentric barrel connectors, and/or tip connectors.

Figure 3:
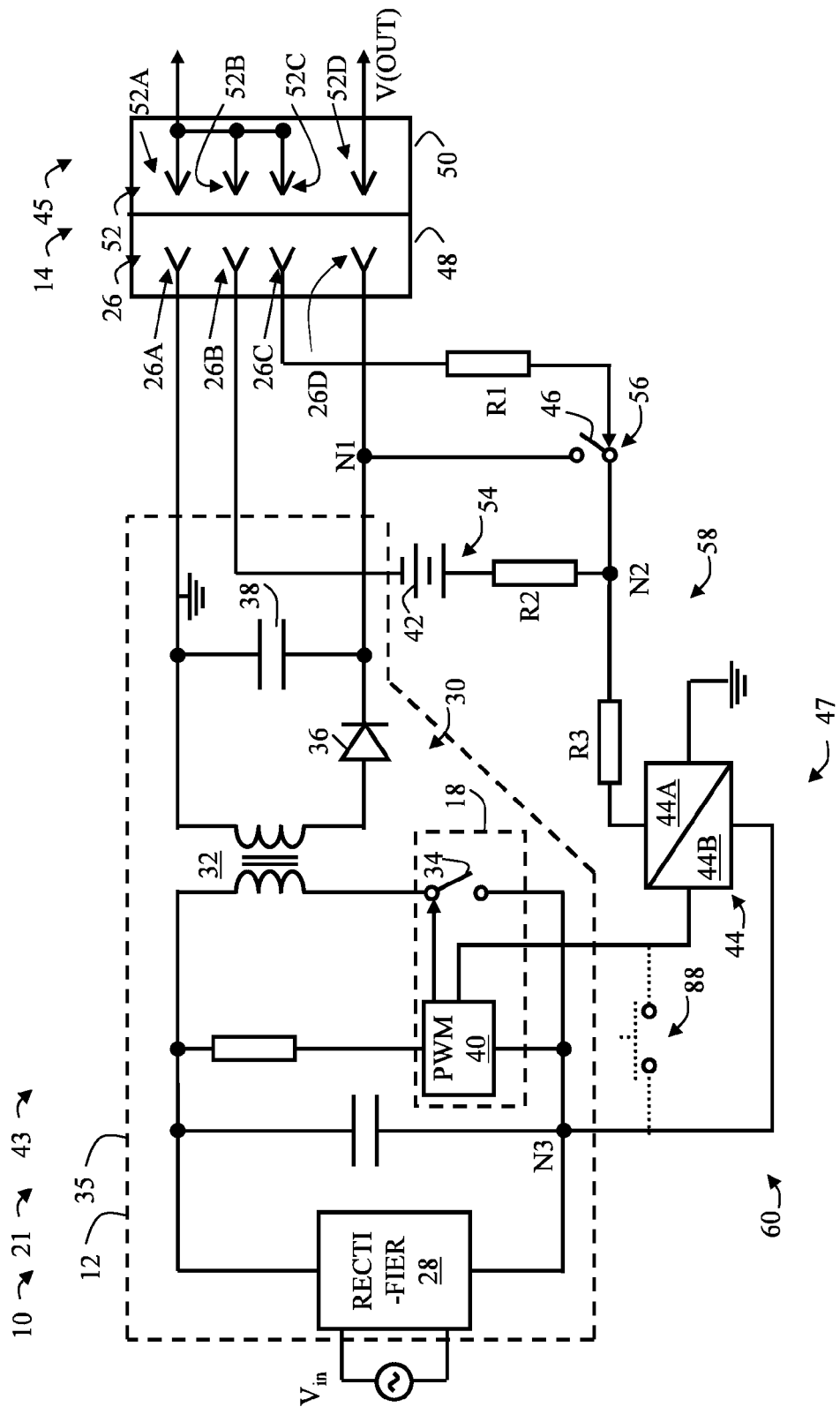
FIG. 3 is a schematic diagram showing an example of an illustrative adapter system.
Figure 4:
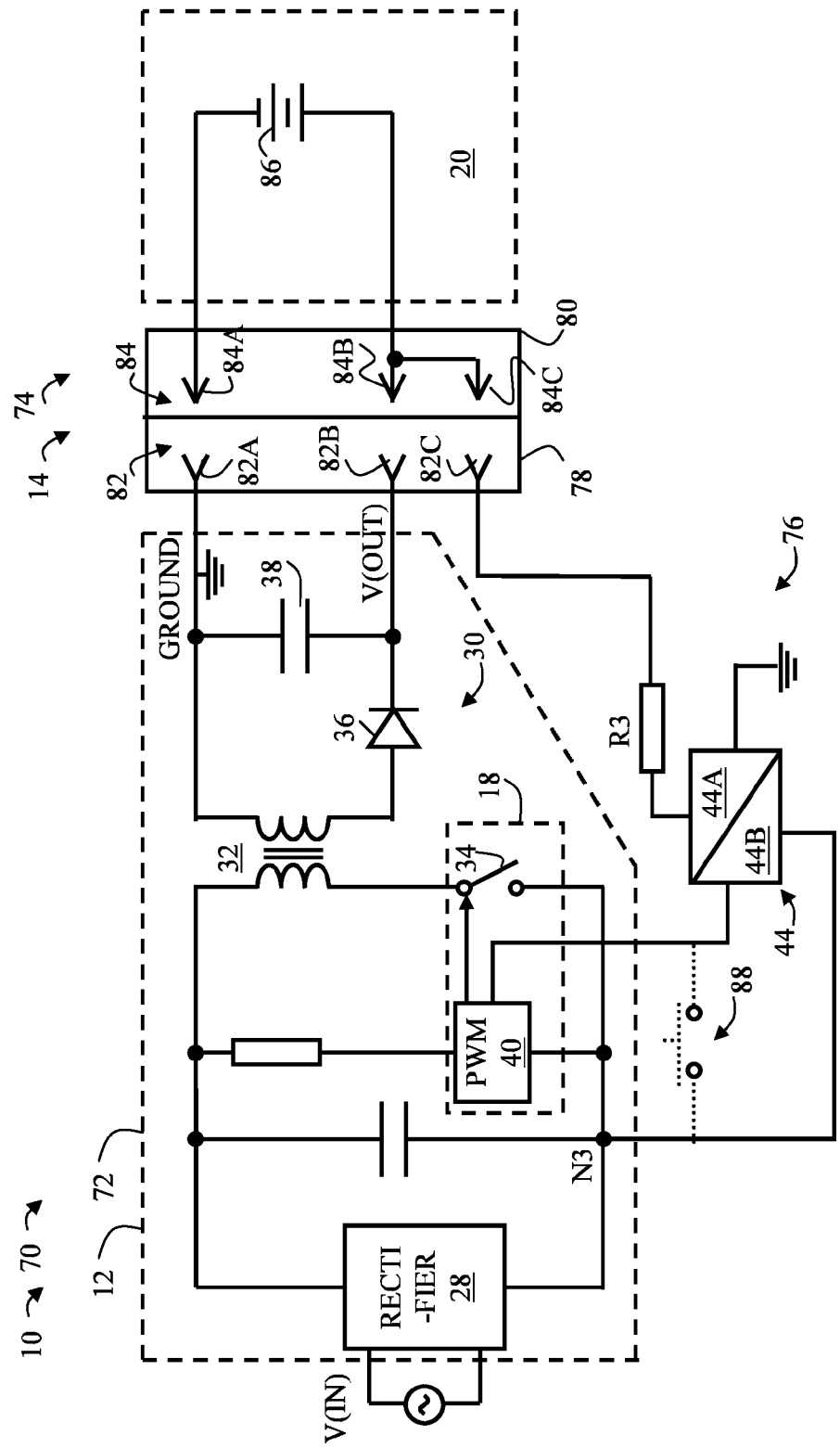
FIG. 4 is a schematic diagram showing another example of an illustrative adapter system.

The topology generally depicted in FIGS. 2-4 is for flyback-style adapters that may be used to provide power to laptops or mobile electronic products. Other topologies are possible using the methods and devices described herein, as may be appreciated by one having skill in the art. As depicted, converter 13 may include a rectifier circuit 28. An input voltage V(IN) is generally input into rectifier circuit 28, which converts the alternating input voltage (AC) to direct voltage (DC) at the output of rectifier circuit 28. Rectifier circuit 28 may include well-known components to rectify the voltage and to provide electromagnetic interference filtering.

The rectified output of rectifier circuit 28 may be applied across primary windings of a transformer 32 of a flyback converter subcircuit 30. Flyback converter subcircuit 30 may include flyback transformer 32, a flyback switch 34, an in-line diode 36, and a capacitor 38. Application of the rectified voltage to transformer 32 may be controlled by control assembly 18. Control assembly 18 may include a pulse width modulator (PWM) 40 and a flyback switch 34 controlled by PWM 40.

Flyback switch 34 may be any suitable switching device configured to be driven by a driving component such as PWM 40. For example, switch 34 may be a semiconductor device such as a metal-oxide field effect transistor (MOSFET). Typical embodiments may utilize MOSFETs because of their high commutation speed and high efficiency at low voltages. In other examples, switch 34 may include a bipolar junction transistor (BJT). PWM 40 may be any electrical circuit configured to drive switch 34 at a predetermined switching frequency and/or duty cycle. PWM 40 may be embodied as an integrated circuit, and may be configured to accept one or more inputs, for example from control circuit 16, in addition to one or more outputs that communicate with switch 34.

Switch 34 may be driven by PWM 40 to repeatedly connect and disconnect the rectified output of circuit 28 to transformer 32 at the predetermined frequency. When switch 34 is closed, the primary windings of transformer 32 experience an increase in magnetic flux as current flows in the primary windings. However, transformer 32 is configured such that in this condition, diode 36 in series with the secondary windings of transformer 34 is reverse-biased and transformation is blocked. When switch 34 is opened, magnetic flux drops, and power is transferred to the secondary side of transformer 34 because diode 36 is now forward-biased. This in turn supplies V(OUT) and charges capacitor 38. When switch 34 is again closed, diode 36 is again reverse-biased and V(OUT) is supplied by capacitor 38. Because the output of this system is controllable by controlling the duty cycle, this rapidlyswitching power supply arrangement provides a tightly regulated output at V(OUT), and may provide further functionality such as active power factor correction.

As depicted in FIG. 2, control circuit 16 may sense on a signal line 37 a condition of connector system 14 and provide a signal to converter 13. Two nonexclusive options are shown. In a first example, a control signal may be provided on a signal line 39 shown partially in dashed lines to a component of a control assembly, such as a switch, in rectifier circuit 28. This control signal may act to cause the switch (not shown) to open, thus disabling circuit 28 and preventing operation of converter 13. In other examples, a control signal is instead provided on a signal line 41 to a control assembly 18, which includes PWM 40 and switch 34 and which in turn acts to disable converter 13. For example, a control signal may be provided to PWM 40, which responds by discontinuing the driving signal it provides to switch 34. Switch 34 may respond by remaining off or open, thus disabling converter 13.

Turning to FIG. 3, a more specific example of a converter system 10 or an adapter 21 is shown generally as an adapter system at 43. As is described further below, adapter system 43 includes an example of converter 12 or 13, shown as a converter 35, a connector system 45 as an example of a connector 14 or 15, and a control circuit 47 as an example of a control circuit 16.

In this example, connector system 45 includes a first connector component 48 having four elements 26, referred to as elements 26A, 26B, 26C, and 26D. Element 26A may be electrically connected to a ground associated with flyback converter subcircuit 30. Element 26D may be electrically connected to the output voltage of converter 35. Elements 26B and 26C may be electrically connected to components of control circuit 16. A second connector component 50 may include connector elements 52, including connector elements 52A, 52B, 52C, and 52D corresponding one-for-one to respective ones of connector elements 26A, 26B, 26C, and 26D. The connector elements 52A, 52B, and 52C may be shorted together such that coupling of the connector components results in electrical connection of elements 26A, 26B, and 26C, thus connecting all three to ground. In an embodiment where the connector elements are coaxial or barrel connectors, connector elements 52A, 52B, and 52C may be formed of a single barrel-shaped conductor that contacts connector elements 26A, 26B, and 26C.

In this example, control circuit 47 may include an energy storage device 54, such a battery 42, an electrical isolator 44, and a switch 56, such as a transistor 46. Battery 42 may be a chargeable battery, and may be any suitable internal stored-power component. For example, battery 42 may be a button cell or lithium-ion coin cell. In other examples, energy storage device 54 may include a capacitor.

Isolator 44 may be any suitable electronic component configured to be controlled by one circuit while making or breaking a connection in a second circuit electrically isolated from the first. Isolator 44 may be referred to as a signal-generating element, because it generates a signal provided to control assembly 18. In some examples, control circuit 47 may include a connection-sensing circuit 58 coupling connector component 48 to isolator 44 for producing the first control signal received from connector elements 26B and 26C and a control-signal-applying circuit 60 for applying the first control signal to control assembly 18 in response to receipt of the control signal from the connection-sensing circuit.

Isolator 44 may be an opto-isolator. Regardless of its specific implementation, isolator 44 may further be considered to have a source side 44A and a controlling side 44B, where source side 44A is controlled by connection-sensing circuit 58 and controlling side 44B applies the control signal to control-signal-applying circuit 60. Transistor 46 may be any suitable switch configured to conduct between one pair of terminals given an input signal on another pair of terminals, and, for example, may be a bipolar-junction transistor having a base, a collector, and an emitter or a field-effect transistor having a source, a drain, and a gate.

In the example of FIG. 3, the negative terminal of battery 42 is electrically connected to connector element 26B, and the base of transistor 46 is electrically connected to connector element 26C through a resistor R1. The other terminals of transistor 46 are respectively connected to the output voltage line at N1, and to the positive terminal of battery 42 at node N2 via a resistor R2. Source side 44A of isolator 44 is electrically connected to node N2 through a resistor R3, and to a local circuit ground. One conductor extending from controlling side 44B of isolator 44 is electrically connected to rectifier circuit 28 and to PWM 40. For example, as shown, a ground conductor extending from controlling side 44B may be connected to node N3, which in turn is connected to the rectifier circuit 28 and PWM 40. Node N3 may effectively be a local circuit ground having the low or negative side of the rectified output voltage of rectifier circuit 28. A second conductor from the controlling side of isolator 44 is connected to a controlling input of PWM 40, as shown.

When connector system 45 is in a connected state, connector elements 26B and 26C are connected to the local ground on the output side of the converter, which connects the negative terminal of battery 42 to the local ground. This completes a circuit, causing a battery voltage on battery 42 to power the source side 44A of isolator 44. This in turn causes the controlling side 44B to electrically connect the controlling input terminal of PWM 40 and node N3, effectively shorting the circuit between the controlling input terminal and the ground terminal. The ground voltage on the controlling input terminal can be considered a control signal having a first state.

In this example, PWM 40 is configured to respond by providing a driving signal to switch 34, which enables converter 35 and provides converter output voltage V(OUT). With V(OUT) now provided at N1, and with the base of transistor 46 connected to ground, current will flow through transistor 46 to node N2, which powers isolator 44 and also charges battery 42. Accordingly, as long as connector system 45 remains in a connected state, converter 35 will continue to be operational.

Continuing with the example of FIG. 3, when connector system 45 is placed in a disconnected state by uncoupling connector elements 26 and 52, battery 42 and transistor 46 are disconnected from ground. This denies isolator 44 of its source of power, causing it to no longer connect node N3 to the controlling input terminal of PWM 40. The signal at the controlling input terminal of PWM 40 can now be said to be in a second state. PWM 40 is configured to respond by discontinuing its driving signal to flyback switch 34, thereby opening the switch. When flyback switch 34 is open continuously, flyback converter subcircuit 30 and thereby converter 35 are disabled. By this arrangement, power is saved by disabling converter 35 when converter system 21 is not connected to external device 20.

FIG. 4 depicts yet another example of a converter system 10. In this example, a converter system 70 includes a converter 72, a connector system 74, and a control circuit 76. The desired connection-dependent disabling effect of the previous example may be obtained without using an internal battery such as battery 42. Connector system 74, another example of a connector system 14, may include first connector component 78 and second connector component 80, each having respective connector elements 82 and 84. Connector elements 82 include connector elements 82A, 82B, and 82C. Connector elements 84 include connector elements 84A, 84B, and 84C. Connector element 82A may be electrically connected to a ground associated with flyback converter subcircuit 30, while connector element 82B is connected to the output voltage of converter 72, and connector element 82C is connected to a component of control circuit 76. When connector component 80 is coupled to connector component 78, connector element 84A connects with connector element 82A, connector element 84B connects with connector element 82B, and connector element 84C connects with connector element 82C.

In this example, a battery 86 of external device 20 may supply the electromotive force to power isolator 44. In other words, when connector system 74 is in a connected state, source side 44A of isolator 44 will be electrically connected through resistor R3 to a positive terminal of battery 86 via connector elements 82C and 84C of connector system 74. The other terminal of battery 86 is grounded to a circuit ground of an output circuit of flyback converter subcircuit 30 via connector elements 82A and 84A of the connector system. This completes a circuit and powers isolator 44. In similar fashion to the previous example shown in FIG. 3, one conductor of controlling side 44B is again connected to a ground terminal of PWM 40 via node N3 and the other conductor of isolator controlling side 44B is connected directly to a control input terminal of PWM 40. As described with reference to converter 35 in FIG. 3, the control signal applied to PWM 40 by isolator 44 has the same corresponding effect of enabling and/or disabling converter 72 based on the connection status of connector system 74.

It may be appreciated that battery 86 may not have sufficient reserve charge to power control circuit 76 as described. To remedy this situation, a manually operable bypass switch 88 may be provided across the lines connecting controlling side 44B of isolator 44 to the ground and control terminals of PWM 40. For example, a push-button bypass switch 88 may be provided as shown in dotted line in FIG. 4. Should battery 86 of the external device prove to be inadequately charged, switch 88 may be temporarily closed to connect the ground and control terminals of PWM 40, thus manually providing a control signal to start switching of flyback switch 34. This in turn results in an output voltage V(OUT), which is then applied to source side 44A of isolator 44 through the connection of connector elements 82B and 84B, the electrical connection of connector elements 84B and 84C in connector component 80, the connection of connector elements 82C and 84C, and resistor R3.

Returning now to FIG. 3, bypass switch 88 may also be included in converter 43 as shown in dotted line. In the example of FIG. 3, a switch providing manual operation may be desirable, for example, if battery 42 is depleted or inoperable for some reason.

In other examples, not pictured in detail, isolator 44 controls rectifier circuit 28, as discussed with reference to FIG. 2. With an otherwise similar arrangement to the various examples depicted in FIGS. 3 and 4 and as represented by signal line 39 shown in dotted line and extending from control circuit 16. This control of circuit 28 may be accomplished by placing controlling side 44B of isolator 44 in a current carrying conductor of circuit 28 such that the output of circuit 28 is interrupted when isolator 44 does not have power. Alternatively, controlling side 44B of isolator 44 may control a disabling switch in circuit 28 or elsewhere in converter 14. In other words, placing connector system 14 in a disconnected state by disconnecting the connector components may deny isolator 44 its source of power by any of the means previously described. Instead of providing an input to PWM 40, isolator 44 (or control circuit 16 generally) may simply disconnect or otherwise interrupt the flow of current in another portion of the circuitry of converter 12.

As discussed above with reference to FIG. 3, it may be appreciated that in some examples, control circuit 16 may include a connection-sensing circuit and a control-signal-applying circuit. For example, a connection-sensing circuit 58 in the example shown in FIG. 3 may include battery 42, transistor 56, and their associated connections and resistors. A control-signal-applying circuit 60 in this example may include isolator 44 and associated connections at node N3 and PWM 40. In some cases, source side 44A of isolator 44 may be included in a connection-sensing circuit while controlling side 44B is included in a control-signal-applying circuit. In other examples, a connection-sensing circuit extends into connector system 14.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the various embodiments of the present invention has been presented for purposes of illustration, but is not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
a converter configured to convert electrical energy having an input voltage received from an external electrical energy source into electrical energy having an output voltage different than the input voltage, the converter including a control assembly responsive to a control signal in a first state that enables operation of the converter, and the control assembly responsive to the control signal in a second state that disables operation of the converter;
a first electrical connector component configured to connect with a second electrical connector component to conduct energy from the converter to an associated external electrical device; and
a control circuit operatively coupled to the first electrical connector component and also operatively coupled to a converter circuit ground of the converter through an electrical coupling included in the second electrical connector component when the second electrical connector component is connected to the first electrical connector component, the control circuit being configured to set the control signal in the first state when the first electrical connector component is connected to the second electrical connector component, and to set the control signal in the second state when the first electrical connector component is not connected to the second electrical connector component.

2. The system of claim 1, wherein
the control circuit extends into the first electrical connector component; and
the control circuit is electrically connected to the converter when the first electrical connector component is connected to the second electrical connector component, and
the control circuit is electrically disconnected from the converter when the first electrical connector component is not connected to the second electrical connector component.

3. The system of claim 2, wherein
the first electrical connector component includes a first conductor that conducts current at the output voltage during operation of the converter and a second conductor connected to the converter circuit ground; and
the control circuit is electrically connected to at least one of the first conductor and the second conductor when the first electrical connector component is connected to the second electrical connector component.

4. The system of claim 3, wherein
the control circuit includes a signal-generating element and a battery supplying current at a battery voltage, and
the battery voltage is applied to the signal-generating element when the first electrical connector component is connected to the second electrical connector component.

5. The system of claim 4, wherein
the control circuit includes a switch that couples a voltage on the first conductor to the signal generating element when the first electrical connector component is connected to the second electrical connector component.

6. The system of claim 5, wherein
the battery is a chargeable battery, and
the switch applies the output voltage to the battery for charging the battery during operation of the converter when the first electrical connector component is connected to the second electrical connector component.

7. The system of claim 5, wherein
the external electrical device applies an electrical energy having an external voltage to the first conductor when the first electrical connector component is connected to the second electrical connector component, and
the switch couples the external voltage to the signal generating element when the first electrical connector component is connected to the second electrical connector component.

8. The system of claim 3, wherein
the control circuit includes a signal-generating element, and
when the first electrical connector component is connected to the second electrical connector component, the signal-generating element is coupled to the first conductor and to an external voltage applied to the first output conductor by the external electrical device.

9. The system of claim 1, further comprising a bypass switch that bypasses the control circuit and is manually operable to apply the first control signal to the converter.

10. A system comprising:
a converter configured to convert electrical energy having an alternating current voltage into electrical energy having a direct current voltage, the converter including a control assembly responsive to a first control signal and operable in a first mode in response to a first state of the first control signal, the control assembly when operating in the first mode enabling operation of the converter, and operable in a second mode in response to a second state of the first control signal, the control assembly when operating in the second mode disabling operation of the converter;
a first electrical connector component configured to connect with a second electrical connector component associated with an external electrical device, the first electrical connector component providing a second control signal having a connected state when the first electrical connector component is operatively coupled to a converter circuit ground of the converter through an electrical coupling included in the second electrical connector component when the first electrical collector component is connected to the second electrical connector component, and a disconnected state different from the connected state when the first electrical connector component is not connected to the second electrical connector component; and
a control circuit responsive to the second control signal, the control circuit configured to provide the first control signal in the first state when the second control signal is in the connected state and to provide the first control signal in the second state when the second control signal is in the disconnected state.

11. The system of claim 10, wherein
the converter includes a converter conductor conducting current necessary for operation of the converter, and
the control assembly includes a switch operatively connected to the converter conductor for enabling and disabling the conduction of current in the converter conductor in response to the first control signal.

12. The system of claim 10, wherein
the converter includes an input circuit for receiving electrical energy at the alternating current voltage and an output circuit for outputting electrical energy at the direct current voltage, the input circuit and output circuit being electrically isolated from each other, and
the control circuit includes a connection-sensing circuit for producing the first control signal and a control-signal-applying circuit for applying the first control signal to the control assembly in response to receipt of the control signal from the connection-sensing circuit, the connection-sensing circuit being electrically isolated from the control-signal-applying circuit.

13. The system of claim 12, wherein the control circuit further comprises an isolator operatively coupling the connection-sensing circuit and the control-signal-applying circuit.

14. The system of claim 13, wherein
the connection-sensing circuit includes a battery supplying current at a battery voltage, and
the battery voltage is applied to the isolator when the first electrical connector component is connected to the second electrical connector component.

15. A system comprising:
a first electrical circuit configured to convert alternating current into substantially direct current, the first electrical circuit including a flyback converter having a pulse width modulator (PWM) configured to receive a control signal;

a control circuit configured to receive a connection status signal and to provide the control signal to the PWM in response to the connection status signal; and a first electrical connector component configured to electrically connect to an external device through a second electrical connector component, the first electrical connector component configured to provide the connection status signal to the control circuit, the connection status signal operatively coupled to a circuit ground of the first electrical circuit through an electrical coupling included in the second electrical connector component when the second electrical connector component is connected to the first electrical connector component;

wherein, in response to a first state of the control signal, the PWM enables the flyback converter; and in response to a second state of the control signal, the PWM disables the flyback converter.

16. The system of claim 15, wherein the control circuit includes an opto-isolator and a battery supplying current at a battery voltage;

the control circuit is configured to apply the battery voltage to the opto-isolator when the first electrical connector component is connected to the external device through the second electrical connector component; and in response, the opto-isolator is configured to provide the control signal in the first state to the PWM by electrically connecting a port of the PWM to the circuit ground of the first electrical circuit.

17. The system of claim 15, further comprising a bypass switch that bypasses the control circuit and is manually operable to provide the control signal to the PWM.

\* \* \* \* \*